United States Patent
McMullen et al.

(10) Patent No.: US 12,056,503 B2
(45) Date of Patent: Aug. 6, 2024

(54) ISOLATING APPLICATIONS AT THE EDGE

(71) Applicant: Fastly, Inc., San Francisco, CA (US)

(72) Inventors: Tyler McMullen, San Francisco, CA (US); Jonathan Foote, San Francisco, CA (US); Patrick Hickey, San Francisco, CA (US); Jason Cook, San Francisco, CA (US)

(73) Assignee: Fastly, Inc., San Francisco, CA (US)

( * ) Notice: Subject to any disclaimer, the term of this patent is extended or adjusted under 35 U.S.C. 154(b) by 0 days.

(21) Appl. No.: 18/352,920

(22) Filed: Jul. 14, 2023

(65) Prior Publication Data

US 2024/0020131 A1 Jan. 18, 2024

Related U.S. Application Data

(63) Continuation of application No. 17/378,963, filed on Jul. 19, 2021, now Pat. No. 11,704,133, which is a continuation of application No. 16/292,100, filed on Mar. 4, 2019, now Pat. No. 11,068,281.

(60) Provisional application No. 62/637,910, filed on Mar. 2, 2018, provisional application No. 62/637,935, filed on Mar. 2, 2018.

(51) Int. Cl.
*G06F 9/445* (2018.01)
*G06F 8/41* (2018.01)
*H04L 67/02* (2022.01)

(52) U.S. Cl.
CPC ............... *G06F 9/445* (2013.01); *G06F 8/41* (2013.01); *H04L 67/02* (2013.01)

(58) Field of Classification Search
None
See application file for complete search history.

(56) References Cited

U.S. PATENT DOCUMENTS

2015/0067686 A1* 3/2015 Davis .................. G06F 9/44521
718/100

OTHER PUBLICATIONS

J. Yi et al., "Incorporating Resource Safety Verification to Executable Model-based Development for Embedded Systems," 2008 IEEE Real-Time and Embedded Technology and Applications Symposium, St. Louis, MO, USA, 2008, pp. 137-146, doi: 10.1109/RTAS.2008.28. (Year: 2008).*

* cited by examiner

Primary Examiner — Andrew M. Lyons

(57) ABSTRACT

Disclosed herein are enhancements for deploying application in an edge system of a communication network. In one implementation, a runtime environment identifies a request from a Hypertext Transfer Protocol (HTTP) accelerator service to be processed by an application. In response to the request, the runtime environment may identify an isolation resource to support the request, initiate execution of code for the application, and pass context to the code. Once initiated, the runtime environment may copy data from the artifact to the isolation resource using the context and return control to the HTTP accelerator service upon executing the code.

20 Claims, 9 Drawing Sheets

ISOLATING APPLICATIONS AT THE EDGE

RELATED APPLICATIONS

This application is a continuation of, and claims the benefit of priority to, U.S. application Ser. No. 17/378,963, filed Jul. 19, 2021, soon to be issued as U.S. Pat. No. 11,704,133, on Jul. 18, 2023, and entitled "ISOLATING APPLICATIONS AT THE EDGE", which is a continuation of, and claims the benefit of priority to, U.S. application Ser. No. 16/292,100, filed Mar. 4, 2019, now issued as U.S. Pat. No. 11,068,281 on Jul. 20, 2021, and entitled "ISOLATING APPLICATIONS AT THE EDGE", which itself claims the benefit of priority to U.S. Provisional Patent Application No. 62/637,910, entitled "VIRTUALIZED APPLICATIONS IN A CONTENT DELIVERY NETWORK," filed Mar. 2, 2018, and U.S. Provisional Patent Application No. 62/637,935, entitled "VIRTUAL MACHINE ISOLATION IN CONTENT DELIVERY NETWORKS," filed Mar. 2, 2018, all of which are hereby incorporated by reference in their entirety.

BACKGROUND

Content delivery networks have evolved to provide more than just caching content at the edge. Rather, many content delivery networks now provide distributed denial of service (DDoS) protection, security shields, load balancing, video streaming, content optimization, and other services on behalf of their customers. In addition, their customers are now able to run their own application code at the edge, to process incoming requests in a customized manner.

Allowing customer applications to run at the edge presents several challenges with respect to isolation. When one application is not effectively isolated from another, a number of problems can occur. For example, one customer's application may interfere with another customer's application on the same server. In another example, one application may be able to access data that it shouldn't. The failure of one application may also take down other applications at the same time—or even the entire server.

Various solutions have been attempted to isolate applications at the edge. In one, each customer is given a virtual machine within which to run their applications. This approach isolates one customer's application(s) from another's, but fails to isolate processing of the customer's own requests. Thus, one instance of the customer's application code handling one request may interfere with another instance of the code handling another, different request. In another solution, a virtual machine is allocated on a per-request basis. This approach effectively isolates the processing of one request from another, but consumes a prohibitive amount of computing overhead.

Overview

Technology is disclosed herein for isolating applications at the edge. In an implementation, a request is received at a server for content associated with a given customer. The request is routed to an isolation runtime environment in which customer applications are able to run in isolation from each other. An artifact is produced for each application that includes both native code and meta data. In addition, virtual resources or nodes are provisioned in memory in anticipation of the applications being invoked by the isolation runtime.

When the applications are invoked, the isolation runtime calls their native code and passes an isolation context to the native code. The isolation context specifies, for example, the memory locations that will be available to the native code. As the native code executes, the isolation runtime enforces various parameters to keep the code from interfering with other instances of the same code or the native code for other applications.

In some implementations, an application provisioning process ensures that a customer's native code can be safely executed at the edge. The provisioning process includes compiling an untrusted application from a customer into a semi-trusted state. For example, a customer application written in one programming language (C, C++, Rust, and the like) may be compiled into assembly code and then native code for execution on edge systems, such as cache nodes. The compiler enforces the isolation runtime parameters when compiling the program and produces the artifacts that hold the metadata and native code for a given program. The artifacts may then be deployed to and loaded in the various isolation runtime environments in the servers distributed across a content delivery network.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

The following description and associated figures teach the best mode of the invention. For the purpose of teaching inventive principles, some conventional aspects of the best mode can be simplified or omitted. The following claims specify the scope of the invention. Note that some aspects of the best mode cannot fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

Figure 1:
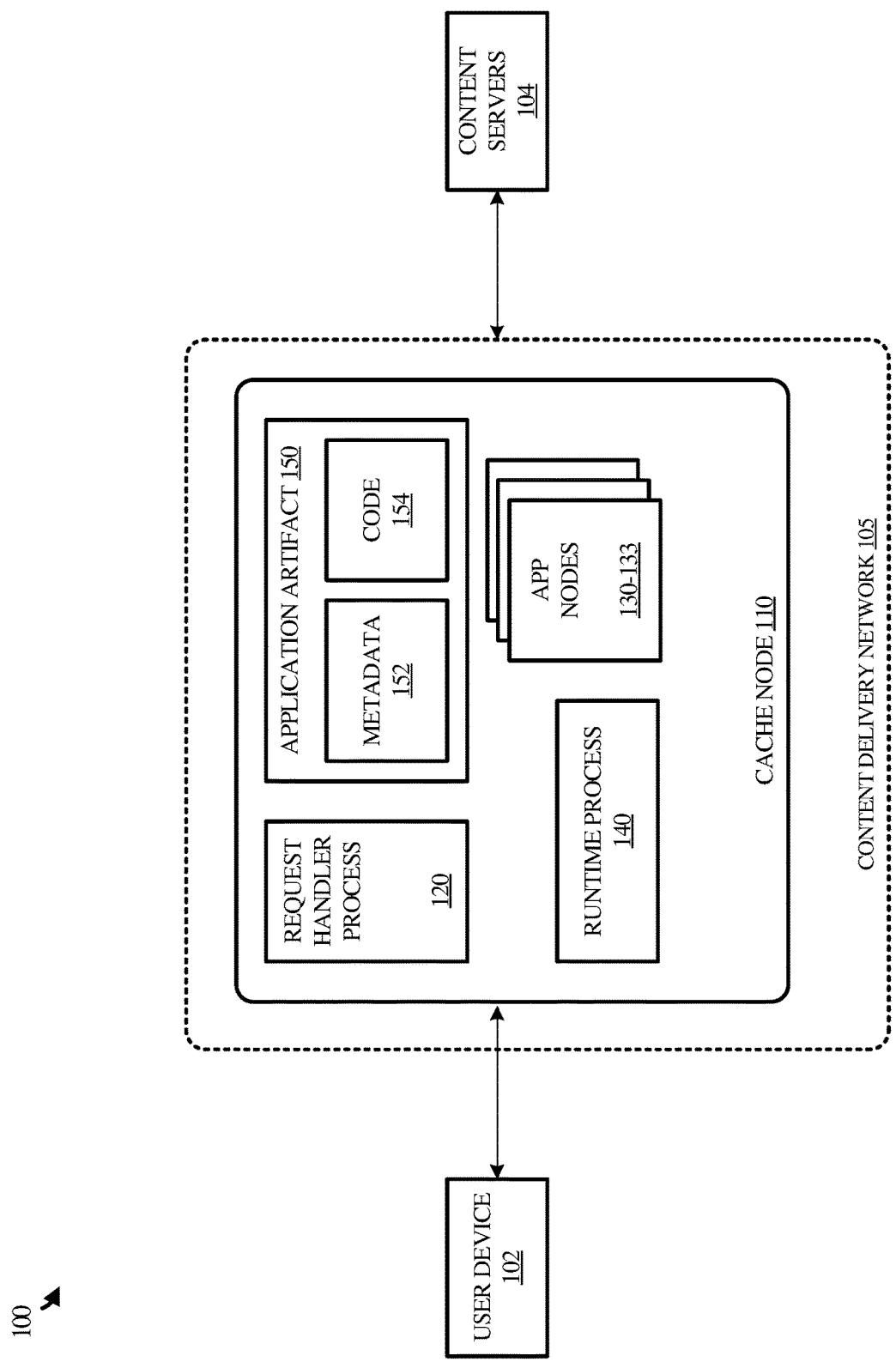
FIG. 1 illustrates a communication system for implementing applications in cache nodes of a content delivery network according to an implementation.

Technology is disclosed herein for isolating applications at the edge. In a highly simplified example, a content delivery network serves as an intermediary between end users and customer origins. A typical server or cache node in a content delivery network receives requests for content from end-user applications and web browsers. A layer of software on the server that is managed by the network operator serves the content to the end-user from its cache or retrieves the content from a customer origin if the content is not in the cache or is stale. This layer of software may comprise a Varnish Configuration Language (VCL) service, an Apache Traffic Server service, or some other Hypertext Transfer Protocol (HTTP) acceleration service.

In addition to being processed by the network operator's software, the request may also be passed to application code that is managed by the customer. The customer application code may perform any of a variety of functions with respect to the request or the content such as resizing an image, translating application programming interface (API) requests, or breaking down a single request into multiple requests.

For a request to be safely processed by a given customer application in isolation from other requests and other applications, an isolation runtime environment is provided. The isolation runtime environment selects an isolation resource from a reserved set of isolation resources to support the request and establishes a context that can be used for the request. (The isolation resources may be referred to as virtual machines or virtual nodes in some scenarios.) The context includes, for example, an address pointer or range of addresses that correspond to the isolation resource (virtual memory space) allocated for use by the customer application's native code. The isolation runtime then calls that native code and passes the context to it. The native code begins to execute and in so doing, may attempt to access a memory location that has yet to receive a copy of the required data. This causes a fault, which the isolation runtime handles by copying data from an artifact associated with the application to the memory location. The native code is then able to resume executing and, for example, read and process the data that is now stored at the memory location. Once the execution of the native code is completed, the isolation runtime process may return control of the process to the layer of software managed by the network operator.

In some examples, in identifying the fault, the isolation runtime process may be used to identify memory read faults. In particular, when an isolation resource is allocated to support a request, the isolation resource may comprise a virtual memory space that is available for the use of the application. However, when a request is initiated by the native code for a virtual memory location that has yet to be allocated data or yet to be allocated a segment of physical memory, a fault may occur that is identified by the isolation runtime process. A description of this fault may be delivered to the isolation runtime process via a number of mechanisms including the Portable Operating System Interface (POSIX) signal handler interface, the Linux "userfaultfd" interface, or other operating system-specific interfaces. Using this description of the fault, the isolation runtime process, which can then determine what caused the fault and what should be done to respond to the fault based on metadata information in the artifact. This may include copying data from the artifact into the isolation resource, leaving the portion of physical memory blank, or defining that the requested data does not exist.

In some implementations, in deploying the application to the cache nodes, a customer may write the application in a first programming language (C, C++, Rust, and the like). Once written, the application be compiled into an assembly code and then native code for execution on edge systems, such as cache nodes. The compiler enforces the isolation runtime parameters (memory requirements, variable requirements, execution constraints, and the like) when compiling the program and produces an artifact for the application. The artifact includes the native code to execute the application and further includes metadata, wherein the metadata may comprise global variables used by the application, configuration requirements of the application, execution constraints of the application, and the like. The artifact may then be deployed to and loaded in the various isolation runtime environments in the cache nodes distributed across a content delivery network.

Referring now to the drawings, FIG. 1 illustrates a communication system 100 for implementing applications in cache nodes of a content delivery network according to an implementation. Communication system 100 includes user device 102, content servers 104, and content delivery network 105. Content delivery network 105 includes cache node 110 with request handler process 120, application artifact 150, runtime process 140, and application nodes 130-133, which are representative of isolation instances. Although demonstrated with a single cache node in the example of FIG. 1, content delivery network 105 may deploy any number of cache nodes in one or more Points of Presence (PoPs) to provide the desired application isolation. Cache node 110 may be implemented in the context of a data center and on one or more physical or virtual computing systems of which computing system 901 is broadly representative.

In operation, user device 102 may initiate a request for content that is obtained by cache node 110, wherein cache node 110 caches data from content servers 104 and/or user device 102. When the request is obtained by cache node 110, request handler process 120 may be used to process the request. Request handler process 120 may comprise a VCL service, an Apache Traffic Server service, or some other HTTP acceleration service. Request handler process 120 may determine how the requests are handled and how responses are given to content requests. In some implementations, a request handler process may be organized into subroutines that execute at different times, and often include if-then statements that are used to implement administrator defined rules for the various content requests. In the present implementation, request handler process 120 may identify that the content request requires the use of an application that is implemented using application artifact 150, runtime process 140, and application nodes 130-133. Artifact 150 includes code 154 that is representative of the native code to implement the application. Artifact 150 further includes metadata 152 that is representative of global variables, a fault data structure, configuration information, or some other similar information related to the application.

To invoke the application, request handler process 120 may generate a notification for runtime process 140. In response to the notification, runtime process 140 may select an application node from application nodes 130-133 to support the request. Application nodes 130-133 may comprise memory spaces available to isolate different execution instances of an application. Once selected, runtime process 140 may initiate execution of code 154 and pass context to code 154. The context may provide an address pointer or other addressing information related to the selected application node of application nodes 130-133. Once initiated, runtime process 140 may monitor for faults in the execution of code 154 and respond to the faults using at least metadata 152.

Figure 2:
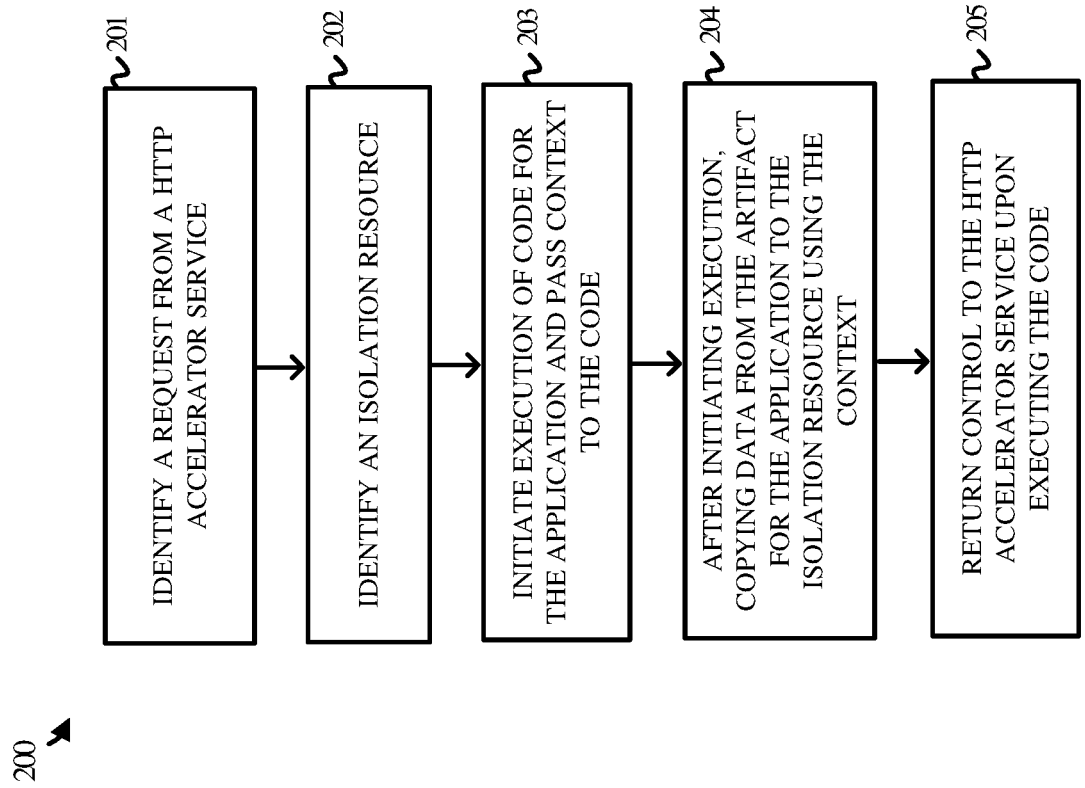
FIG. 2 illustrates an isolation process in an implementation.

FIG. 2 illustrates an isolation process 200 for operating a cache node according to an implementation. Isolation process 200 may be implemented in program instructions in the context of any of the software applications, modules, components, or other such programming elements of cache node 110. The program instructions direct the underlying physical or virtual computing system or systems to operate as follows, referring parenthetically to the steps in FIG. 2 in the context of the communication system 100. Isolation process 200 may be implemented by runtime process 140 in some examples.

As illustrated, isolation process 200 includes identifying (201) a request from a HTTP accelerator service, such as request handler process 120. In response to the request, the method identifies (202) an isolation resource from a plurality of isolation resources reserved in advance of the request. The isolation resources that are demonstrated in communication system 100 as application nodes 130-133 may be representative of memory spaces that are capable of storing data that is unique to an instance of the executing application.

Once an isolation resource is selected, the method further initiates (203) execution of code for the application and passes context to the code to ensure isolation for the application execution. As an example, runtime process 140 may identify application node 130 to support the execution of an application for a content request from user device 102. Once selected, runtime process 140 may establish the context associated with the selected application node and provide the context to code 154 for execution. This context may permit code 154 to execute and maintain a unique memory space for variables and other data used by the application. In some implementations, the context may comprise a memory address or range of addresses that can be used for reading and writing the required data for the application. After initiating the execution of the code, the method further copies (204) data from application artifact to the isolation resource using the context and returns (205) control to the HTTP accelerator service upon executing the code.

In some implementations, when the application artifact is generated by compiling WebAssembly code into the native code for the cache nodes, global variables and other elements used by the application may be stored as part of metadata 152. As code 154 executes to support a unique request, code 154 may attempt to access one of the elements from metadata 152, but a fault will be triggered as the element has yet to be copied from metadata 152 into the memory space allocated to the execution instance. This fault may be monitored by runtime process 140. Once identified, runtime process 140 may determine what caused the fault and what should be done to respond to the fault. The response may include copying a value to the memory space of the allocated isolation resource, generating an error notification, restarting the execution of the application, or some other similar response. Advantageously, by copying data to an isolation resource as it is required by the executable code, memory resources may be preserved and allocated as required for each instance of the application.

In some implementations, code 154 or runtime process 140 may include a set of application programming interfaces (APIs), which can be used to obtain information, transfer information, obtain requests, or some other similar interaction outside of the isolated application instance. For at least one example, the limited set of API functions may be implemented as part of the isolation resources that permit the application instance to communicate with processes outside of the application. These APIs may be implemented as part of the compile process for the application to implement desired functions, may be implemented as part of the developer or customer specification, or may be implemented in any other manner.

In some implementations, application nodes 130-133 may comprise a virtual memory space that is available for use by each execution instance of the application. In using the virtual memory space, the native code may generate a request for an address in the virtual memory space. If data exists in the requested address, then the requested data may be provided to the native code, however, if data has yet to be written to the requested address, then a fault may occur as a physical memory address is yet to be allocated to the data. When the fault occurs, the fault may be identified by runtime process 140, wherein runtime process may write the required data to a physical memory location and map the physical memory location to the corresponding virtual memory location, may map a portion of physical memory with the corresponding virtual memory and leave the physical memory blank, or may identify that the requested element does not exist that causes an error.

Figure 3:
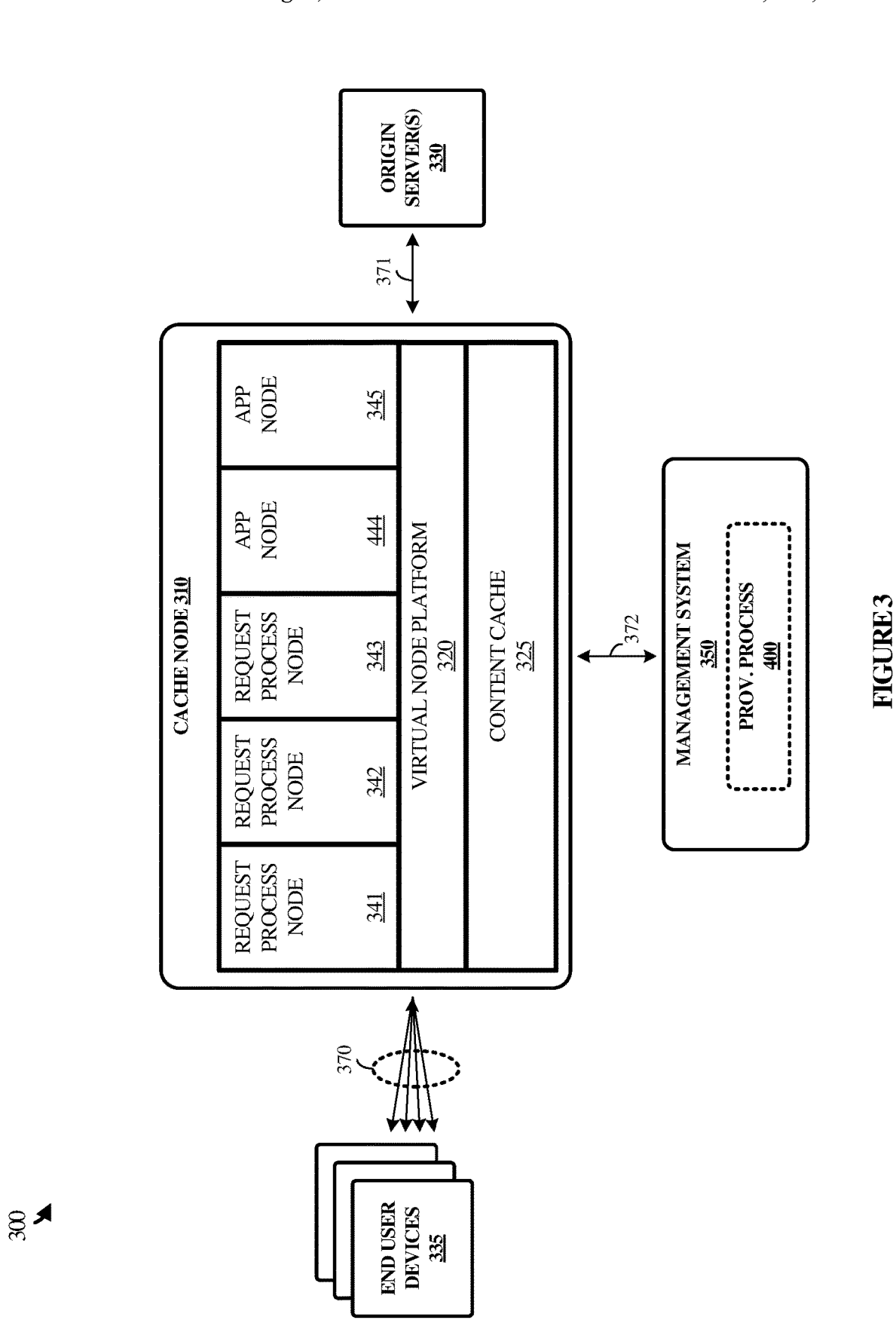
FIG. 3 illustrates a communication system to manage configurations of cache nodes in a content delivery network according to an implementation.

FIG. 3 illustrates a communication system 300 for managing configurations of cache nodes in a content delivery network according to another implementation of isolating applications at the edge. Communication system 300 includes cache node 310, origin server(s) 330, end user devices 335, and management system 350. Cache node 310 communicates with end user devices 335, origin server(s) 330, and management system 350 via communication links 370-372. Cache node 310 further includes nodes 341-345, virtual node platform 320, and content cache 325. Management system 350 is configured to employ provisioning process 400, which is further described in FIG. 4. Although demonstrated with a single cache node in the present example, additional cache nodes may be employed by a content delivery network. Cache node 310 may be implemented in the context of a data center and on one or more physical or virtual computing systems of which computing system 901 is broadly representative. Management system 350 may also be implemented one or more physical or virtual computing systems of which computing system 901 is broadly representative In operation, end user devices 335 generate requests for network content, such as Internet web pages or media content such as videos, pictures, and music. Rather than using the origin servers to supply the requested content, a domain name server (DNS) may be used that directs the requests to cache node 310 of a content delivery network. Upon receipt of a request, the cache node processes the requests and supplies the required content to the requesting device. Requested network content that is already stored in the cache node can be provided quickly to the end user devices, while network content that is not already stored in the cache node can be responsively requested from origin server(s) 330 to be provided to the end user device. This content may, in some examples, be cached for future content requests by the same or other end user devices.

In the present implementation, in providing the caching operations, cache node is configured with request process nodes 341-343 and application nodes 344-345, which represent virtual nodes capable of providing caching processes for various content providers. Request process nodes 341-343 may comprise virtual machines or containers that each run an instance of VCL or some other similar HTTP acceleration service. For example, a first content provider may use a first VCL configuration that is employed as request process node 342, while a second content provider may use a second VCL configuration that is employed using request process node 343. In some implementations in providing the VCL configurations for each of the content service providers, cache node 310 may provide an overarching VCL configuration that can provide various uniform operations for how requests are handled and how responses are given to content requests for any of the service providers (e.g. a firewall for malicious source IP addresses). This overarching VCL may operate as its own virtual node or may operate as part of virtual node platform 320, which may comprise an operating system and/or hypervisor capable of providing resources to the virtual nodes. As an example, when a request is received by an end user device, the overarching VCL configuration may provide first operations on the request and forward the request to a request process node that is specific to the content requested.

In some implementations, each of the cache nodes may be provided with different HTTP acceleration configurations for the different customers. To implement the different HTTP acceleration configurations, such as VCL configurations, each of the customers may employ their unique configuration within a virtual node on the cache node. Once deployed, requests that correspond to a particular customer may be forwarded to the virtual node that provides their HTTP acceleration operations. In some examples, in conjunction with the HTTP acceleration virtual nodes, the customers may also deploy applications as described herein to provide various functionality in providing and managing content for requesting end user devices.

Accordingly, cache node 310 further includes application nodes 344-345 that are used to perform various operations on or with respect to content as it is obtained from the origin servers and/or delivered to the end user devices. These operations may include image optimization, video optimization, or any other similar operation on content to be provided to the end user. For example, when a user requests content, the VCL configuration in one of nodes 341-343 may trigger an operation by one of application nodes 344-345. For example, if a video were requested by an end user, an application in one of application nodes 344-345 may be called by a request process node to perform an optimization operation on the content before providing the content to the requesting end user device.

Figure 4:
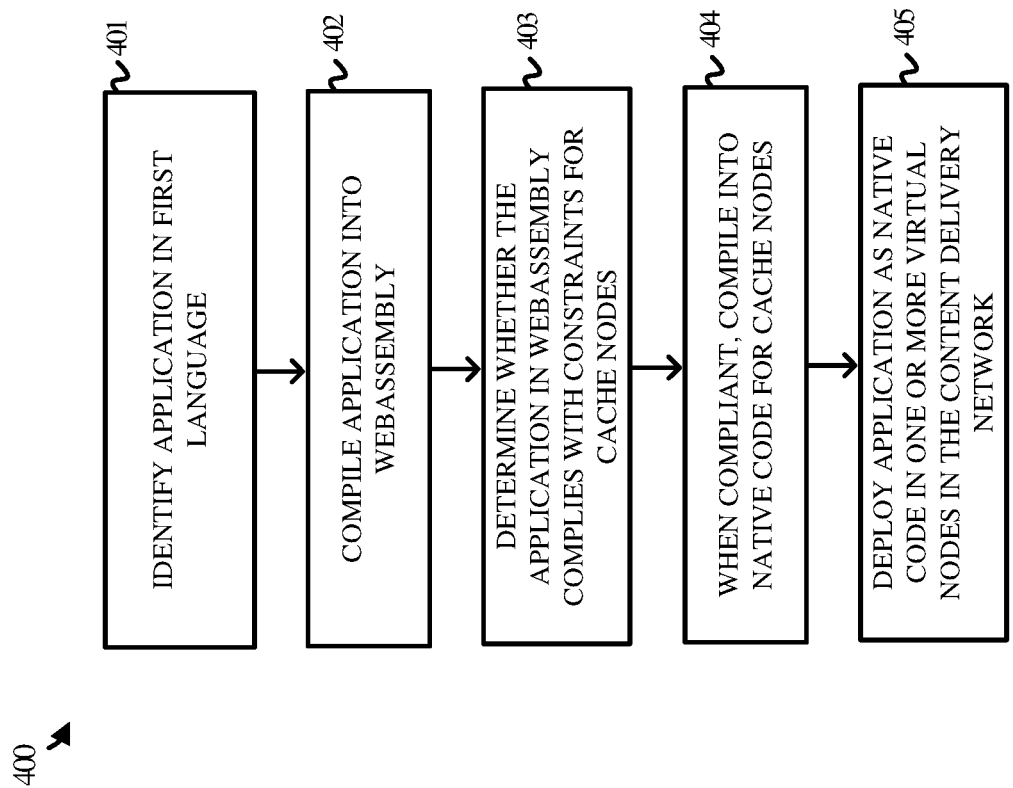
FIG. 4 illustrates a provisioning process in an implementation.

FIG. 4 illustrates a provisioning process 400 employed by a management system to configure cache nodes of a content delivery network. Provisioning process 400 may be implemented in program instructions in the context of any of the software applications, modules, components, or other such programming elements of management system 350. The program instructions direct the underlying physical or virtual computing system or systems to operate as follows, referring parenthetically to the steps in FIG. 4 in the context of the communication system 300.

As described herein, cache nodes in a content delivery network employ VCL and other similar HTTP acceleration configurations to provide content to requesting end user devices. To ensure that each content provider is capable of maintaining their own configuration, each service provider may be provided with its own virtual node that provides the HTTP acceleration operations specific to its service. However, in addition to the HTTP acceleration configurations provided for each of the service providers, some of the service providers may also employ applications on the cache node that can be used to better service the requests of the content.

To deploy an application to the cache nodes of the content delivery network, provisioning process 400 includes identifying (401) an application in a first language. For example, an administrator for a particular service provider may generate an application to provide one of the forgoing operations, such as image or video optimization, formatting images or videos, or some other similar operation. In generating the application, the administrator or administrators may generate the application using C, C++, Java, or some other similar programming language. Once the application is generated and identified by management system 350, management system 350 may compile (402) the application into WebAssembly code, wherein the operations of the application may be translated from the first language to the WebAssembly language. This WebAssembly language is a standard that defines a binary format and a corresponding assembly-like text format for executable code in Web pages.

After the WebAssembly code is generated, management system 350 may determine (403) whether the application in WebAssembly complies with constraints for cache nodes of the content delivery network. In determining whether the WebAssembly code meets the constraints of the cache node, test executions and simulations may be used to determine whether the application meets memory, race condition, looping, or other similar constraints for the implementation in the cache nodes. If the application in the WebAssembly code does not meet the constraints, then a notification may be provided to the administrator for the service provider indicating the issue with the application. In contrast, if the application does meet the constraints, then the application in the WebAssembly code may be recompiled (404) into code native to the cache nodes of the content delivery network and deployed (405) within one or more cache nodes of the content delivery network.

As described previously, when an application is deployed within a cache node of the content delivery network, the application may be implemented within a virtual node, wherein the virtual node may comprise a virtual machine or a container used to separate the operations of the application from other applications on the cache node. In particular, when deployed within a cache node, a VCL virtual node operating on the cache node may be used to call into the application depending on data for a content request. For example, when a request is for video content, the VCL virtual node may call into the application to optimize the video for providing to the requesting end user device. In some implementations, the applications may interact with and communicate to other processes using an application programming interface (API), which can be used to obtain information, transfer information, obtain requests, or some other similar interaction with the VCL node or another application node operating on the cache node.

In some implementations, when determining whether an application is compliant with constraints, management system 350 may compile the native code, such that the native code complies with constraints defined by an administrator of the content delivery network, defined by the customer associated with the application, or defined in any other manner. For example, a constraint may indicate that the application should not exceed a first quantity of memory, but may permit the application to use up to a second quantity of memory so long that other operations occur (e.g., generate a notification regarding the memory usage, limit memory usage for other portions of the application, or some other operation). Based on the constraints, the native code for the application may include operations that perform checks on the memory usage. Thus, if new data were to be written by the application, the compiled native code may perform operations to determine whether the new data exceeded the memory constraint for the application. The data may then be written or cause an error based on the memory usage for the application. In some examples, in compiling the native code, management system 350 may identify portions of the WebAssembly code that could meet or exceed the memory constraint. Once identified new operations or portions of native code may be generated that can be used to identify when the memory usage of the application meets or exceeds the memory constraint and provides instructions of what to do when the constraint is met or exceeded. Although demonstrated in the previous example as using a memory constraint, it should be understood that similar operations may be used with respect with other constraints. These constraints may include processing resource constraints, race condition constraints, or some other type of constraint that can be implemented via operations in the native code to identify and respond when a constraint occurs.

Figure 5:
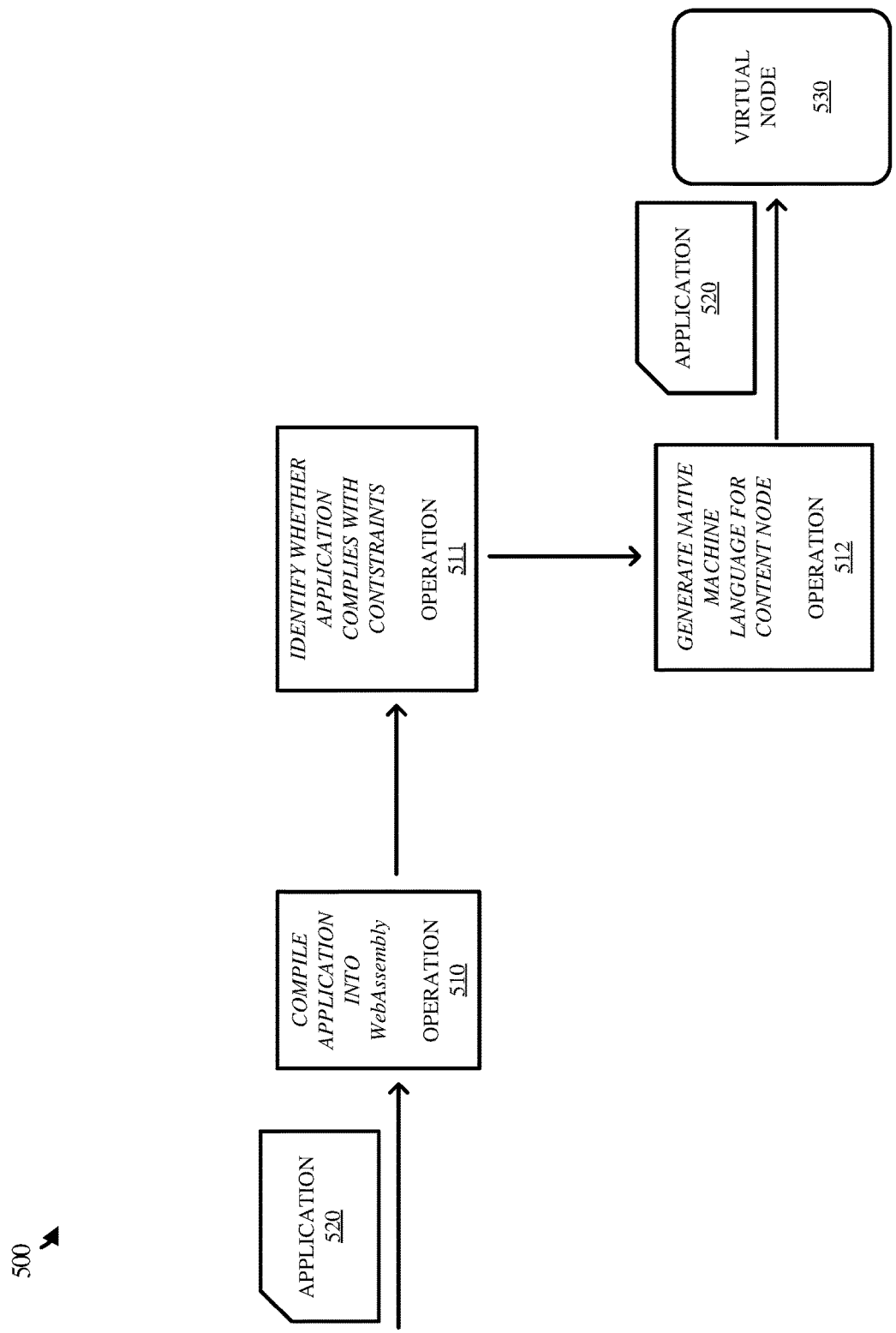
FIG. 5 illustrates an operational scenario related to configuring a content delivery network according to an implementation.

FIG. 5 illustrates an operational scenario 500 of configuring a content delivery network according to an implementation. Operational scenario 500 includes operations 510-512, application 520, and virtual node 530.

In operation, a content provider (e.g. a website provider) generates application 520 using a first programming language. Once generated and identified by a management system for the content delivery network, the management system compiles the application into WebAssembly code at operation 510. Once compiled or translated into the WebAssembly code, operation 511 is performed by the management system to identify whether the application complies with constraints for cache nodes of the content delivery network. In some implementations, in determining whether the application complies with the constraints, the application may operate in a simulated environment to determine whether the application complies with defined constraints for the cache nodes of the network. These may include processing constraints, memory constraints, loops and race conditions, or some other similar constraints. In many implementations, the constraints may be defined by an administrator of the content delivery network, however, it should be understood that the constraints may be determined based on resources available in the cache nodes, or some other similar method of identifying constraints of the physical cache nodes in the content delivery network. If an application does not meet the constraints, then a notification may be provided to the administrator associated with the application indicating that the application in its current state cannot be deployed. In contrast, if the application does meet the constraints, the application may move to operation 512.

In particular, when the application meets the constraints, operation 512 will generate native machine language (such as x86 code) for the cache nodes of the content delivery network and deploy application 520 as at least one virtual node within the content delivery network. This virtual node may comprise a container or may comprise a virtual machine.

In some implementations, once the application is deployed in a cache node, the application may work with one or more other virtual nodes that also execute in the cache node for the service provider. As an example, a content service provider may deploy its own configuration of HTTP acceleration as a virtual node that provides specific operations for the content requests associated with the service provider. To assist the operations of the HTTP acceleration virtual node, the HTTP acceleration virtual node may generate function calls to initiate and implement the application node. For example, when a content request comprises a video request for a video that is not currently cached in the cache node, the HTTP acceleration service may generate a call to the application to optimize the video obtained from the origin server before providing the content to the end user. In this manner, applications that are deployed for a service provider may work in conjunction with the acceleration service to provide desired operations on the content that is provided to the end user.

In some implementations, in interacting with the application on the server, the application may use an API to communicate outside of the virtual nodes. These API commands may include commands such as PUT (PRINT), GET_REQUEST, SEND_RESPONSE, and other similar commands to provide the desired operation. By providing the API with a limited number of functions, the communications of each of the applications may be limited. Accordingly, when content is to be processed by the application, the application may use a first command to obtain the data (from the local cache or the origin), process the data in accordance with the application, and provide the processed content to the desired location.

In some examples, when the application is deployed, the application may be deployed as a container or virtual machine image that can be initiated on various cache nodes of the content delivery network. Accordingly, once an application is determined to comply with the constraints of the network, and the native machine language is generated for the application, the application may be deployed as virtual node image across a plurality of cache nodes in the content delivery network.

Figure 6:
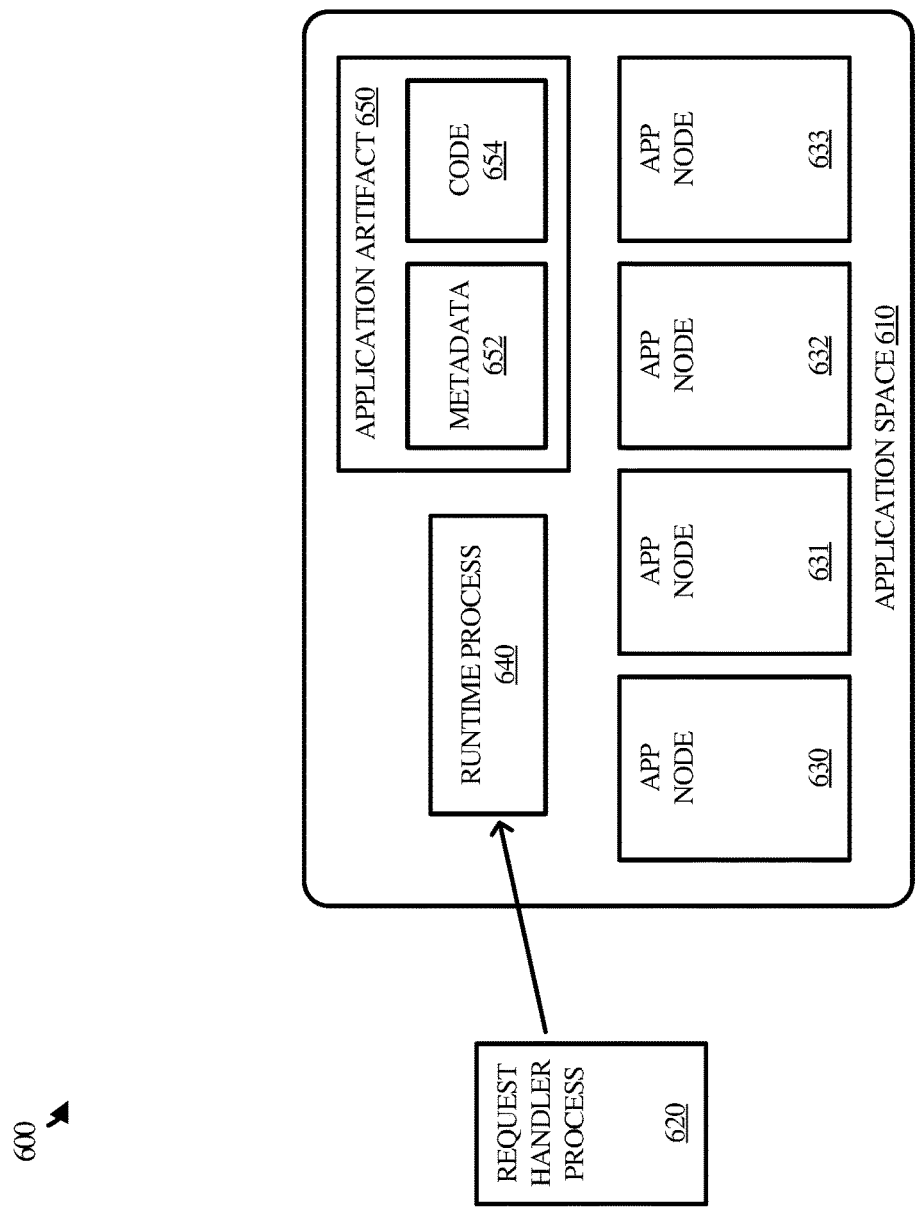
FIG. 6 illustrates a computing environment for executing an application in an edge computing system according to an implementation.

FIG. 6 illustrates a computing environment 600 to execute an application in an edge computing system according to an implementation. Computing environment 600 includes request handler process 620 and application space 610, which may be implemented in one or more cache nodes or other edge computing systems. Application space 610 is representative of elements that provide sandboxed execution instances for an application. Application space 610 includes runtime process 640, application artifact 650 with metadata 652 and code 654, and application nodes 630-633. Application nodes 630-633 are representative of isolation resources that can provide sandboxed or isolated platforms for each iteration of an application.

As described herein, content providers may desire to implement one or more applications at cache nodes or other edge devices, such that content may be processed closer to a requesting user. In handling a request from an end user device, a request handler process 620, which may comprise a VCL operation, an Apache Traffic Server operation, or some other HTTP acceleration service, may determine how the requests are handled and how responses are given to content requests. In some implementations, a request handler process may be organized into subroutines that execute at different times, and often include a plurality of if-then statements that are used to implement administrator defined rules for the various content requests. In some implementations, request handler process 620 may include operations that are used to trigger an application that can provide image processing, video processing, or some other operation. For example, an application deployed at a cache node may provide image optimization for a request device and browser.

Here, when an application is identified by request handler process 620, request handler process 620 may communicate with a runtime process 640 associated with the application. Runtime process 640 is used to initiate the execution of the application using code 654, allocate the required resources for the application in one of applications nodes 630-633 including metadata 652, and manage faults identified during the execution of the code. In at least one example, runtime process 640 may identify or select an application node from application nodes 630-633. Once selected, runtime process 640 may initiate execution of code 654, wherein code 654 is passed context that comprises at least addressing information or a pointer to the application node for the execution instance of the application. In some implementations, application nodes 630-633 are representative of memory spaces that can be used to isolate a first execution instance from one or more other execution instances of the same application. After initiating execution of code 654 and providing access to the application node allocated to the request, code 654 may generate requests to obtain data from memory locations of the allocated application node. For example, if an execution instance were allocated application node 630, code 654 may initiate a request to read data from a memory location in application node 630. In response to the request, a fault may occur as data has not yet been written to the memory location in the application node. To provide the required data, runtime process 640 may monitor for when the faults occur and determine how to respond to the faults. Thus, if code 654 requested a variable that had not yet been copied into the memory space for application node 630, runtime process 640 may identify the variable within metadata 652 and copy the variable into the corresponding location of application node 630. Once copied, code 654 may access the required data for future operations. Advantageously, data may be copied into each of the application nodes as the data is required, limiting the amount of resources that are required for each isolated execution of the application.

Although demonstrated in the example of FIG. 6 with a single application, it should be understood that any number of applications may be deployed in the edge systems to provide various operations. In deploying the applications, each of the applications may be distributed as an application artifact with metadata and native code specific to the application. Additionally, each of the applications may implement their own or share a runtime process to provide the allocation and configuration operations in response to requests. The runtime process or processes may use the same application nodes or different application nodes.

Figure 7:
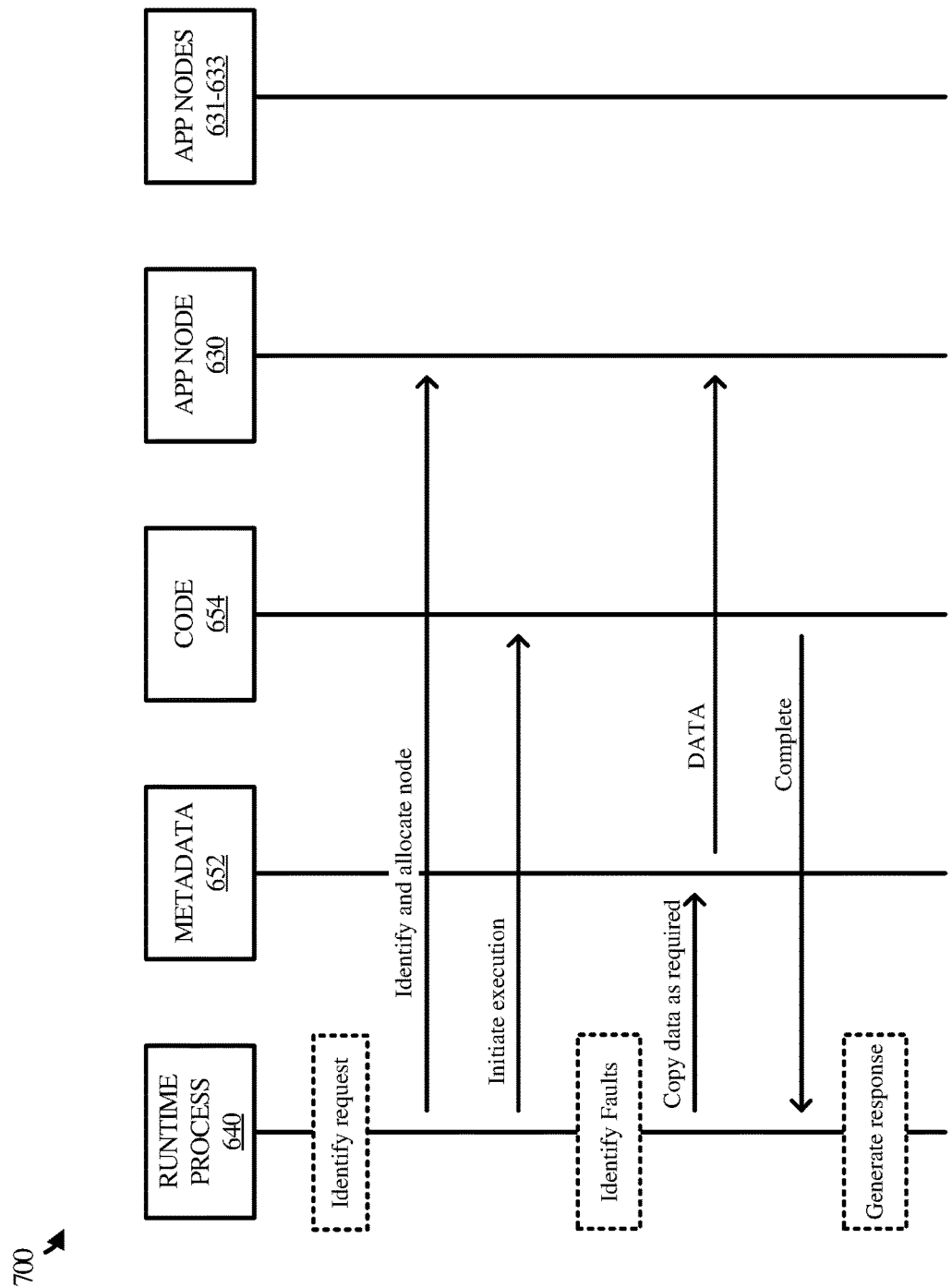
FIG. 7 illustrates a timing diagram representative of the execution of an application in an edge computing system according to an implementation.

FIG. 7 illustrates a timing diagram 700 to execute an application in an edge computing system according to an implementation. Timing diagram 700 includes systems and elements from computing environment 600 of FIG. 6. Although demonstrated as allocating the memory space associated with application node 630 to support a request, it should be understood that any available node (e.g., node that is not allocated to another application execution instance) may be allocated to support the request for the application.

As depicted, runtime process 640 identifies a request to initiate an application associated with application space 610. To support the execution of the application in an edge computing system, an application artifact 650 is generated that includes the native code 654 for execution on the computing system and metadata 652 that is used to support the execution. The metadata may include information about global variables used in the execution of the application, a fault data structure to be used when faults occur in the execution of the native code, resource allocation requirements, or some other similar information to support the execution of the native code.

In some implementations, to generate the application artifact, a management system, such as management system 350 from FIG. 3, may compile an application that is written in a first language to a second language (WebAssembly). Once compiled, the management system may determine whether the application in the second language complies with constraints for the edge deployment computing systems, such as cache nodes. These constraints may comprise memory usage, security, loops, race conditions, or some other similar constraints. In some implementations, if the application fails to meet the constraints, the application may be prevented from deployment to the edge computing systems, however, in other implementations, a trap data structure may be generated that associates possible issues of the application identified from the constraints with error codes or fault handling operations. These operations may include generating a notification for a user associated with the creation of the application, stopping the execution of the application, or providing some other fault response. The fault operations may be defined by the developer of the application, may be defined by the management system based on the type of threat, or may be defined in any other manner. In some examples, the WebAssembly code may be compared to information in one or more data structures to determine when the WebAssembly code qualifies for one or more constraints. Once the constraints are identified from the WebAssembly code, application artifact 650 may be generated with metadata 652 and code 654, wherein code 654 corresponds to native code that is executable by the edge service.

In at least one example, the management system may implement operations in the native code that can be used to identify when a constraint is met. The constraints may comprise race conditions, memory conditions, processing conditions, or some other constraint. For example, a customer generating an application may define a memory limit for each instance of the application. As a result, the management system may identify segments in the WebAssembly code that could exceed the memory limit and generate native code that can implement operations when the memory is exceeded. These operations may include terminating the instance of the application, preventing future executions of the application, generating a notification for the customer associated with the application, or providing some other similar operation.

In addition to adding constraint operations to the native code, the management system may further determine whether the application meets API constraints, wherein the API may be used by an application to call other applications, return to the request handler process, or provide other operations to communicate with processes and storage outside of the isolation instance. If the WebAssembly satisfies the requirements for communicating outside of the isolation instance, then the artifact may be generated with the corresponding API interactions.

In response to identifying the request to execute the application, runtime process 640 may identify and allocate an application node 630 that is available to support the request. This application node may comprise a memory space available to store at least a portion of metadata 652 associated with the application. Once an application node is allocated to support the request, runtime process 640 may initiate execution of code 654 and pass code 654 metadata to code 654, wherein the metadata may be used to at least access the memory space associated with application node 630 (e.g., a memory pointer to application node 630).

After code 654 is initiated, code 654 may require access to application node 630 to obtain variables and other data associated with the application. However, a fault may occur if the data is not yet stored in application node 654. As a result, runtime process 640 may monitor for the faults to occur and may determine how to respond to the faults. Using the data access request example, runtime process 640 may determine that a variable is required by code 654 to provide the operation and may copy the variable (such as a global variable) into the required memory location in application node 630. Once copied, code 654 may access the data from the memory space associated with application node 630.

After the execution of the code, runtime process 640 may provide a result to the request handler process indicating that the required operation was completed. For example, if code 654 performed image optimization for a request, code 654 with runtime process 640 may generate or identify the required optimized image and generate a notification that could be provided to the request handler process. Once the notification is provided to the request handler process, the request handler process may be used to respond to the request by providing the associated optimized image.

In some implementations, the metadata may comprise variables that are unique to the execution instance of the application. In particular, when application node 630 is identified to support the request, runtime process 640 may initiate an operation that writes one or more variables from metadata into application node 630 as the variables are required by code 654. In this manner, the variables may not interfere with the operations of one or more other application instances that are executing on the computing system. Rather, when a variable is required by code 654, code 654 may use an addressing pointer provided by runtime process 640 that corresponds to application node 630 and obtain the required variable from application node 630. Thus, the variables for each instance of the application may be separated into addressing spaces defined by application nodes 630-633. The size and formatting of each of the application nodes memory spaces may also be defined by the metadata, wherein the metadata may identify an initial size requirement of the memory space, a maximum memory size for the application (e.g. as new variables are added during execution), or some other information related to the configuration requirements of the application.

In some implementations, metadata 652 may include a trap data structure that indicates constraints of the application during execution. These constraints may include faults that can be encountered during the execution of the application memory usage, security, loops, race conditions, or some other similar constraint. In at least one example, when a fault is identified, the trap data structure may define how to respond to fault. The response may be determined by the management system when the application artifact is created, may be determined by a user for one or more of the constraints, or may be determined in any other manner. The response may include writing data to the memory space for the application node, such as the case when a request for a variable is identified that is stored as part of the metadata, may include returning error information to the user that generated the content request, stopping or restarting the execution of the application, providing error information to the content provider that generated the application, or providing some other operation. For example, code 654 may encounter an operation that performs an improper mathematical operation (e.g., divide by zero). Rather than causing the computing system to crash, runtime process 640 may monitor for the fault and determine how to respond to the fault using the metadata 652.

In some examples, in identifying the fault, runtime process 640 may be used to identify memory read faults. In particular, when an application node or isolation resource is allocated to support an application request, the isolation resource may comprise a virtual memory space that is available for the use of the application, wherein at least a portion of the virtual memory space is not yet mapped to a physical memory space. When a request is initiated by the native code for a virtual memory location that has yet to be allocated data or yet to be allocated a segment of physical memory, a fault may occur that is identified by the runtime process 640. A description of this fault may be delivered to the isolation runtime process via a number of mechanisms including the POSIX signal handler interface, the Linux "userfaultfd" interface, or other operating system-specific interfaces. Using this description of the fault, runtime process 640 can then determine what caused the fault and what should be done to respond to the fault based on metadata information in the artifact. This may include copying data from the artifact into the isolation resource, leaving the portion of physical memory blank, or defining that the requested data does not exist.

Figure 8:
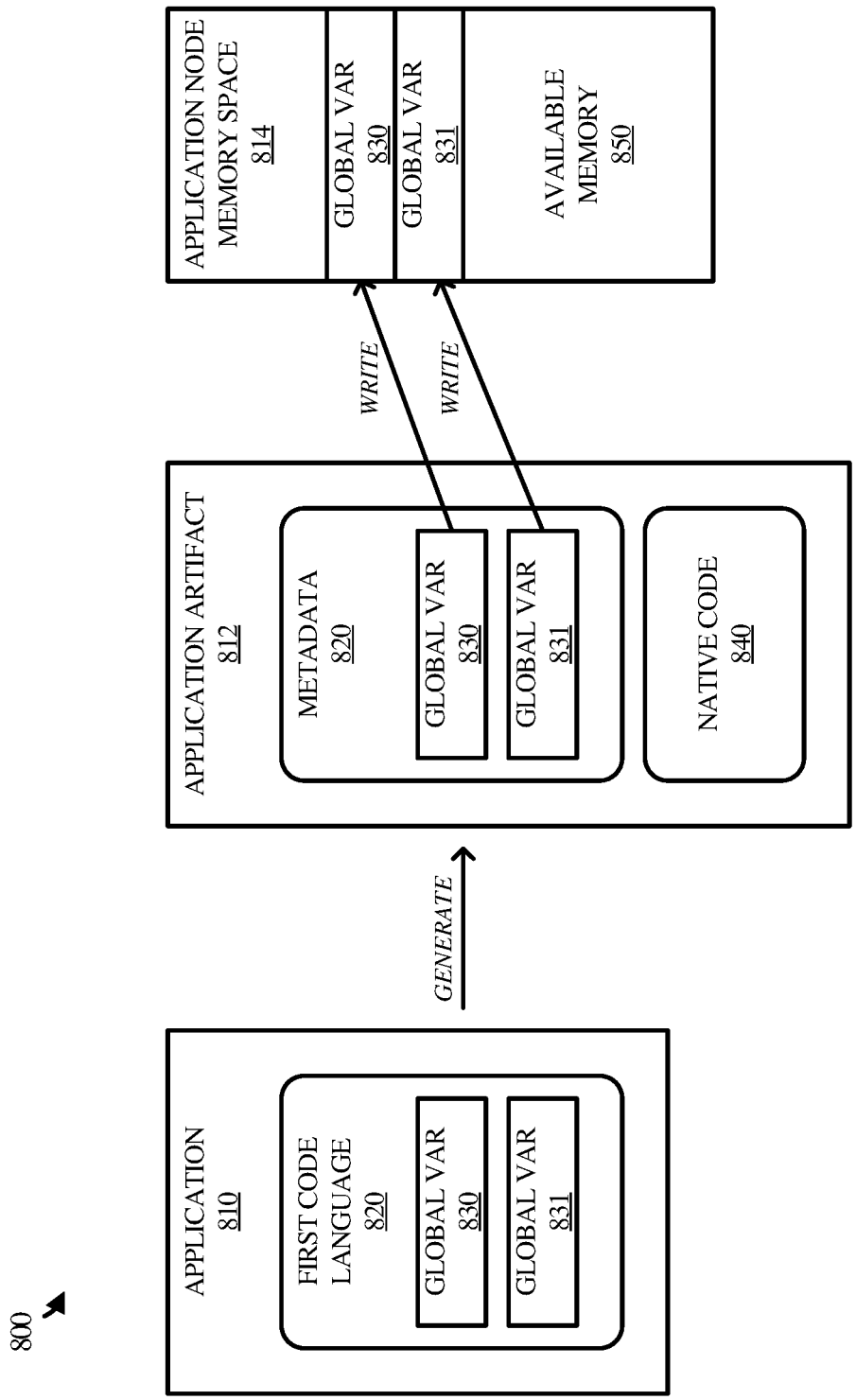
FIG. 8 illustrates an operational scenario related to writing to an application node memory space according to an implementation.

FIG. 8 illustrates an operational scenario 800 of writing metadata to an application node memory space according to an implementation. Operational scenario 800 includes application 810, application artifact 812, and application node memory space 814. Application 810 include first code language 820 with global variables 830-831. Application artifact 812 includes native code 840 and metadata with global variables 830-831. Application nodes memory space includes global variables 830-831 and available memory 850.

As described herein, content providers may generate applications to be deployed across one or more edge computing systems of a network, wherein the applications may be used to provide a variety of operations related to content requested over the web. In generating an example application 810, the application may be generated using first code language 820, wherein code language 820 may include variables, such as global variables 830-831. Once application 810 is generated in first code language 820, a management system may be used to generate application artifact 812 that includes metadata 820 and native code 840 capable of execution in an edge system, such as a cache node. In generating application artifact 820, the management system may first compile application 810 into a WebAssembly language. Once compiled, the management system may determine constraints associated with the application, wherein the constraints may be determined using databases, trial executions of the application, or some other operation. After determining any constraints, application artifact 812 may be generated, where application artifact 812 includes native code 840 that is compiled from the WebAssembly code. Application artifact 812 further includes metadata 820, which is used to store at least global variables 830-831. Metadata 820 may further include configuration requirement information for the application, a trap data structure that indicates constraints of the application, wherein the constraints associate possible faults with actions to be taken when a fault occurs, or some other metadata for the application. For example, the trap data structure may be used for the application when the application encounters a race condition. When a race condition is encountered, a runtime process for the application may consult the corresponding trap data structure to determine any actions to respond to the race condition. If the race condition was identified during the constraint testing operation, then an action may be identified in the data structure, otherwise, a default response may be initiated to respond to the fault.

Once application artifact 812 is generated, application artifact 812 may be deployed to one or more edge systems, such as cache nodes. Once deployed, content requests may be received by the edge systems that can invoke the application. When a request is received, the request may be processed by a HTTP accelerator service capable of forwarding a request to a runtime process associated with at least the application. When the request is received by the runtime process, the runtime process may select an application node, or memory space that acts as an isolation resource for the instance of the application. Once selected, native code 840 may be initiated by the runtime process and passed context (e.g., addressing information), such that native code 840 may access application node memory space 814. In some implementations the context may correspond to a memory address that permits the executing code to access data in application node memory space 814. During the execution of native code 840, a fault may be generated. In response to the fault, the runtime process may determine how to handle the fault. In one implementation, the fault may occur when a request is made for an object that is not yet stored in application node memory space 814. In response to the request, the runtime process may determine which, if any, data should be copied into the memory space accessible to the executing instance. Thus, when a request is generated that corresponds to global variable 830 or global variable 831, the runtime process may copy the associated variable into a memory location of application node memory space 814 that corresponds to the expected memory location for the variable. Once copied, the code may use the variable from memory range. In some implementations, the fault may comprise a "userfaultfd" fault that can be monitored by the runtime service, such that the runtime service will respond when the fault is identified.

Although demonstrated as providing the content in response to a fault, it should be understood that other responses may be implemented when faults are detected. These responses may include restarting the application, generating a notification for the user, or some other response, which may be determined from the constraints stored in metadata 820. In some implementations, faults may be triggered when the virtual memory space associated with the application node is not yet mapped to a physical memory space. For example, during the execution of native code 840, native code 840 may generate a request for an object located in a portion of the virtual memory space. In response to the request, the runtime process may determine whether a fault is triggered, wherein the fault may be triggered if the portion of the virtual memory space is not yet allocated to a physical memory location. In response to the fault, the runtime may consult metadata 820 to determine whether data should be written to a physical memory location and the physical memory location mapped to the virtual memory portion, whether a physical memory portion should be left blank and mapped to the virtual memory portion, whether an error notification should be generated for an administrator, or whether some other operation should occur. As an illustrative example, native code 840 may generate a request in the virtual memory space that is not yet mapped to a physical memory location. In response to the request, the runtime may determine that the request corresponds to global variable 830, may map a portion of physical memory to the virtual memory space, and may copy global variable 830 to the physical memory location, such that the variable is available in the virtual memory space.

Figure 9:
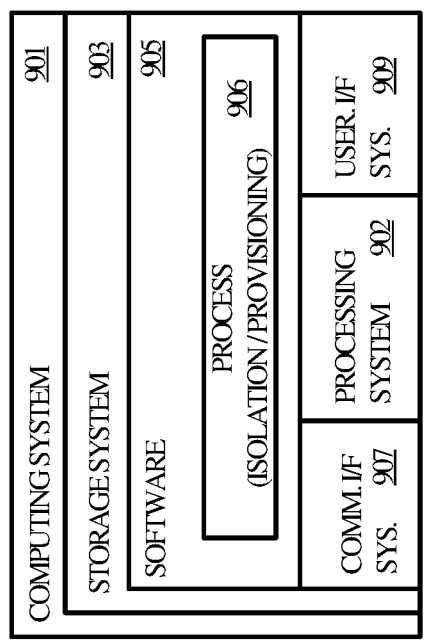
FIG. 9 illustrates a computing system suitable for implementing the various systems, environments, architectures, processes, scenarios, and sequences discussed below with respect to the Figures.

FIG. 9 illustrates computing system 901 that is representative of any system or collection of systems in which the various processes, programs, services, and scenarios disclosed herein may be implemented. Examples of computing system 901 include, but are not limited to, desktop computers, laptop computers, server computers, routers, web servers, cloud computing platforms, and data center equipment, as well as any other type of physical or virtual server machine, physical or virtual router, container, and any variation or combination thereof.

Computing system 901 may be implemented as a single apparatus, system, or device or may be implemented in a distributed manner as multiple apparatuses, systems, or devices. Computing system 901 includes, but is not limited to, processing system 902, storage system 903, software 905, communication interface system 907, and user interface system 909 (optional). Processing system 902 is operatively coupled with storage system 903, communication interface system 907, and user interface system 909.

Processing system 902 loads and executes software 905 from storage system 903. Software 905 includes and implements process 906, which is representative of the isolation and/or provisioning processes discussed with respect to the preceding Figures. When executed by processing system 902 to provide application isolation and/or provisioning, software 905 directs processing system 902 to operate as described herein for at least the various processes, operational scenarios, and sequences discussed in the foregoing implementations. Computing system 901 may optionally include additional devices, features, or functionality not discussed for purposes of brevity.

Referring still to FIG. 9, processing system 902 may comprise a micro-processor and other circuitry that retrieves and executes software 905 from storage system 903. Processing system 902 may be implemented within a single processing device but may also be distributed across multiple processing devices or sub-systems that cooperate in executing program instructions. Examples of processing system 902 include general purpose central processing units, graphical processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which at least some of software 905 may be communicated internally or externally. Storage system 903 may be implemented as a single storage device but may also be implemented across multiple storage devices or sub-systems co-located or distributed relative to each other. Storage system 903 may comprise additional elements, such as a controller, capable of communicating with processing system 902 or possibly other systems.

Software 905 (including process 906) may be implemented in program instructions and among other functions may, when executed by processing system 902, direct processing system 902 to operate as described with respect to the various operational scenarios, sequences, and processes illustrated herein. For example, software 905 may include program instructions for implementing an isolation process and/or a provisioning process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software, virtualization software, or other application software. Software 905 may also comprise firmware or some other form of machine-readable processing instructions executable by processing system 902.

In general, software 905 may, when loaded into processing system 902 and executed, transform a suitable apparatus, system, or device (of which computing system 901 is representative) overall from a general-purpose computing system into a special-purpose computing system customized to provide application isolation and/or provisioning as described herein. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A method comprising:
    identifying an application in a first language;
    identifying isolation runtime parameters;
    compiling the application into an assembly code;
    operating the application in a simulated environment to determine whether the application complies with the isolation runtime parameters;
    determining that the application does comply with the isolation runtime parameters;
    generating a machine language version of the application;
    producing an artifact, wherein the artifact comprises the machine language version of the application and metadata; and
    deploying the artifact to one or more nodes of an edge network.

2. The method of claim 1, wherein the metadata comprises global variables used by the application.

3. The method of claim 1, wherein the metadata comprises configuration requirements of the application.

4. The method of claim 1, wherein the metadata comprises execution constraints of the application.

5. The method of claim 1, wherein the machine language version of the application corresponds to a programming language native to the one or mode nodes of the edge network.

6. The method of claim 1 further comprising, in a node of the one or more nodes:

identifying, in an isolation runtime environment for the node, a request from a Hypertext Transfer Protocol (HTTP) accelerator service to be processed by the application;

identifying an isolation resource from a plurality of isolation resources reserved in advance of the request;

initiating execution of the machine-language version of the application and passing context to the machine-language version of the application;

after initiating execution of the machine-language version of the application, copying data from the artifact to the isolation resource using the context; and returning control to the HTTP accelerator service upon executing the code.

7. The method of claim 6, wherein the data comprises at least one variable.

8. The method of claim 6, wherein the isolation resource comprises a memory space, wherein the context comprises an addressing pointer to a memory location in the memory space.

9. An apparatus comprising:
one or more non-transitory computer readable storage media;
a processing system operatively coupled to the one or more non-transitory computer readable storage media; and
program instructions stored on the one or more non-transitory computer readable storage media that, when executed by the processing system, direct the processing system to:
identify an application in a first language;
identify isolation runtime parameters;
compile the application into an assembly code;
operate the application in a simulated environment to determine whether the application complies with the isolation runtime parameters;
determine that the application does comply with the isolation runtime parameters;
generate a machine language version of the application;
produce an artifact, wherein the artifact comprises the machine language version of the application and metadata; and
deploy the artifact to one or more nodes of an edge network.

10. The apparatus of claim 9, wherein the metadata comprises global variables used by the application.

11. The apparatus of claim 9, wherein the metadata comprises configuration requirements of the application.

12. The apparatus of claim 9, wherein the metadata comprises execution constraints of the application.

13. The apparatus of claim 9, wherein the machine language version of the application corresponds to a programming language native to the one or mode nodes of the edge network.

14. The apparatus of claim 9, wherein the program instructions stored on the one or more non-transitory computer readable storage media that, when executed by the processing system, further direct the processing system to, in one of the nodes of the edge network in which the artifact is deployed:
identify, in an isolation runtime environment, a request from a Hypertext Transfer Protocol (HTTP) accelerator service to be processed by the application;
identify an isolation resource from a plurality of isolation resources reserved in advance of the request;
initiate execution of the machine-language version of the application and pass context to the machine-language version of the application;
after initiating execution of the machine-language version of the application, copy data from the artifact to the isolation resource using the context; and
return control to the HTTP accelerator service upon executing the code.

15. The apparatus of claim 14, wherein the data comprises at least one variable.

16. The apparatus of claim 14, wherein the isolation resource comprises a memory space, wherein the context comprises an addressing pointer to a memory location in the memory space.

17. A method comprising:
identifying an application in a first language;
identifying isolation runtime parameters;
compiling the application into an assembly code;
operating the application in a simulated environment to determine whether the application complies with the isolation runtime parameters;
determining that the application does not comply with the isolation runtime parameters; and
providing a notification to an administrator that the application in its current state cannot be deployed.

18. The method of claim 17, further comprising:
receiving an updated application from the administrator;
identifying updated isolation runtime parameters;
compiling the updated application into an updated assembly code;
operating the updated application in a simulated environment to determine whether the updated application complies with the isolation runtime parameters;
determining that the updated application does comply with the isolation runtime parameters;
generating a machine language version of the updated application;
producing an artifact, wherein the artifact comprises the machine language version of the updated application and metadata; and
deploying the artifact to one or more nodes of an edge network.

19. The method of claim 18, wherein the metadata comprises global variables used by the updated application.

20. The method of claim 17, wherein the isolation runtime parameters correspond to resources available in the one or more nodes of the edge network.

* * * * *